United States Patent
Lewis

(10) Patent No.: US 7,208,904 B2
(45) Date of Patent: Apr. 24, 2007

(54) MULTIPLE MOTOR POSITION CONTROL

(76) Inventor: Clarence A. Lewis, deceased, late of Waltham, MA (US); by Dina M. Lewis, legal representative, 60 Hope Ave., Apt. 316, Waltham, MA (US) 02453

( * ) Notice: Subject to any disclaimer, the term of this patent is extended or adjusted under 35 U.S.C. 154(b) by 0 days.

(21) Appl. No.: 11/039,352

(22) Filed: Jan. 20, 2005

(65) Prior Publication Data
US 2007/0001641 A1    Jan. 4, 2007

Related U.S. Application Data

(60) Provisional application No. 60/359,718, filed on Jan. 29, 2004.

(51) Int. Cl.
*G05B 13/00* (2006.01)

(52) U.S. Cl. ........................ 318/630; 318/560; 101/171; 101/115; 101/134; 101/135; 101/151; 74/409; 74/440

(58) Field of Classification Search ................ 318/630, 318/560; 101/171, 115, 134, 135, 151; 74/409, 74/440
See application file for complete search history.

(56) References Cited

U.S. PATENT DOCUMENTS

| | | | | |
|---|---|---|---|---|
| 3,552,308 A | * | 1/1971 | Minehart | 101/37 |
| 3,570,735 A | * | 3/1971 | Kurz | 226/3 |
| 3,594,552 A | * | 7/1971 | Adamson et al. | 377/18 |
| 3,701,464 A | * | 10/1972 | Crum | 226/3 |
| 3,717,092 A | * | 2/1973 | Crum | 101/248 |
| 4,528,630 A | * | 7/1985 | Sargent | 700/125 |
| 5,570,633 A | * | 11/1996 | Schultz et al. | 101/182 |

\* cited by examiner

*Primary Examiner*—Rita Leykin
(74) *Attorney, Agent, or Firm*—Hamilton, Brook, Smith & Reynolds, P.C.

(57) ABSTRACT

A controller for motor activation providing accurate and repeatable position changes by pressing and releasing a push button switch. Repeatable position changes are made in an advance direction by triggering a digital counter for a predetermined number of cycles of a reference clock signal. Backlash in retard motion of the motor is reduced by similarly asserting a retard motor input for an amount of time determined by another digital counter with a following advance correction made automatically after the retard signal is applied, by applying a predetermined retard-advance movement amount, as again counted by a digital counter. The advance binary amount, the retard binary amount and the retard-advance binary amount of set through binary switch inputs to respective counters to count the respective time periods (TG3, TG1, and TG2).

7 Claims, 9 Drawing Sheets

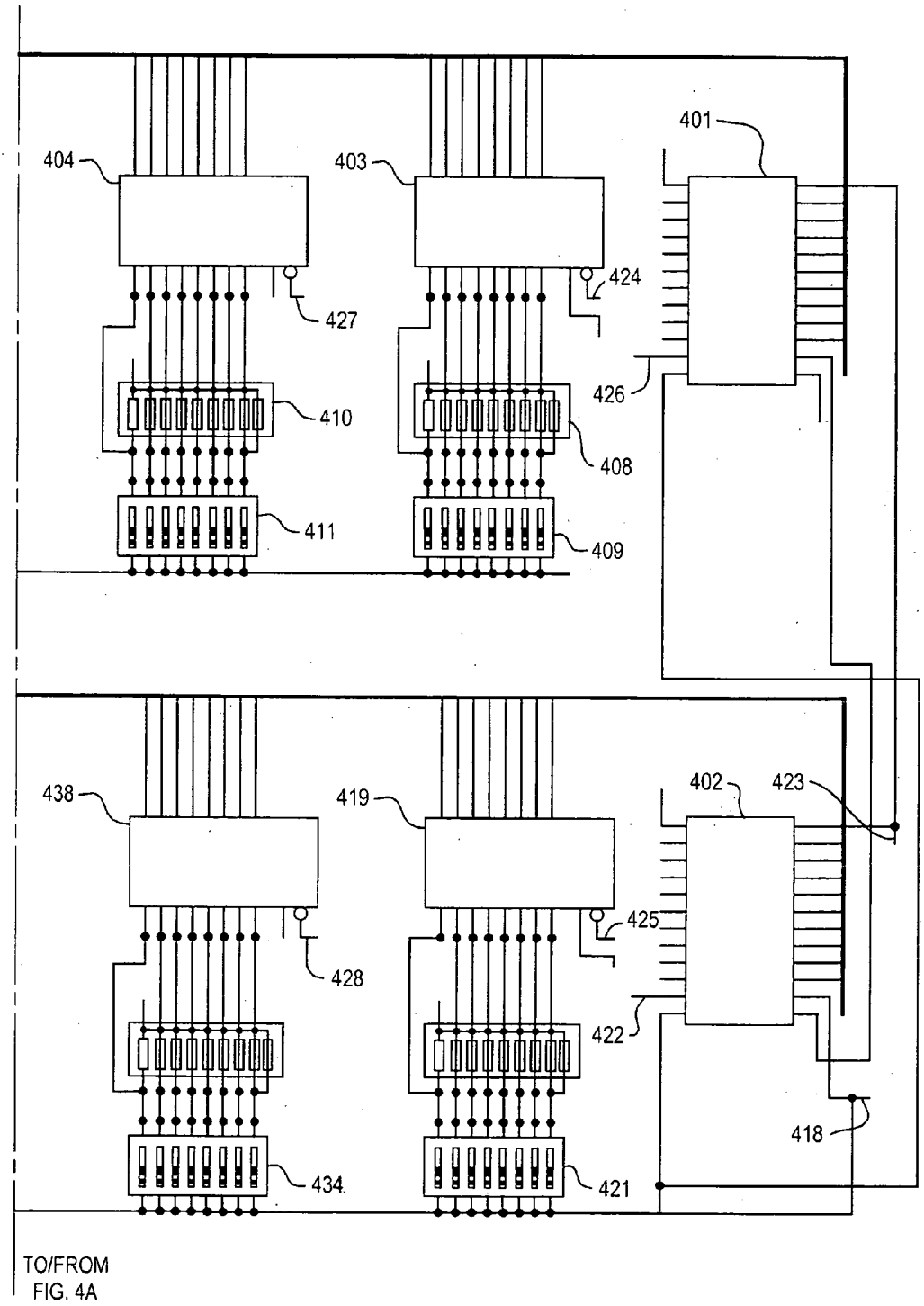

MULTIPLE MOTOR POSITION CONTROL

CROSS REFERENCE TO RELATED APPLICATION

The present application claims the benefit of a prior U.S. Provisional Application No. 60/539,718, filed Jan. 29, 2004. The entire teachings of the above application(s) are incorporated herein by reference.

BACKGROUND OF THE INVENTION

The general field of this invention relates to the controlling of motors for accurate discrete remote positioning control throughout the range of a mechanical mechanism.

There are many production processes that require frequent adjustments by an operator at the beginning of each new job and during the running of the job. In many instances the adjusting mechanisms are located remotely, requiring the operator to climb a latter or walk a good distance each time an adjustment is necessary.

A good example of such an application is in the printing of newspapers. With the advent of four color process printing, which virtually every newspaper offers today, a popular printing machine called a printing tower has emerged as the chosen printing press configuration. The printing tower consists of two four color printing units arranged vertically so that the four process colors (yellow, magenta, cyan and black) are printed simultaneously on each side of the paper. Each printing unit employs two mechanical mechanisms with hand wheels that are used to make adjustments in registration of each color to the other colors. One hand wheel is used for adjustment in the lateral register, in the X direction, while the other mechanical mechanism provides adjustment in the circumferential register, in the Y direction. Thus a tower has a total of 16 mechanical mechanisms that the operator must manually adjust to make corrections in lateral and circumferential registration of the eight colors that are printed on both sides of the paper.

The tower configuration is considered to be superior, as it requires minimal floor space which is ideal for crowded press rooms, the vertical configuration requires the operator to climb a ladder to reach some of the mechanical mechanisms each time he needs to make an adjustment.

Electric motors have been installed on some of these towers with the intent of providing the operator with remote control capability thus making register adjustments much easier.

In those instances where motors have been added to existing mechanisms a number of deficiencies have still arisen that greatly inhibit the success of motorization due to the great frustration of operation personal when using the motor as a means of introducing register correction as opposed to using the hand wheel.

Some of these deficiencies are related all can be eliminated with the teachings of this disclosure.

The standard method for replacing the hand wheels with a motor includes two operator push buttons, one applying voltage to the motor when depressed by the operator driving the motor in one direction, with the other switch when depressed by the operator driving the motor in the opposite direction. Thus the amount of correction introduced depends upon the direction of correction and for how long the operator depressed the switch. The resolution or minimum correction introduced is limited to the minimum time that the operator could depress the switch which is about one third of a second. There has always been the problem that the maximum slew speed is limited to the resolution required to achieve the accuracy that was desired. Typically a 0.005 inch resolution would yield a slew speed of about 1 inch per minute. If the application was on a full range mechanism requiring moving the mechanism 20 inches for different jobs, than it would take 20 minutes or more to reposition the mechanism. For many applications it is not acceptable to require a two motor system where one motor would be used for obtaining the resolution and another motor used to provide a fast slew speed.

The teaching of this application includes a means of increasing the maximum rate of correction significantly as required while simultaneously increasing the resolution.

Other deficiencies have arisen when replacing the hand wheel. For example, when using the hand wheel the operator can automatically compensate for backlash in the mechanism when making an adjustment. As he turns the hand wheel to make an adjustment, he can feel the lesser pressure required when moving through the backlash and would always move through the backlash and then make his correction when he felt the higher pressure required to move the mechanism. When moving the mechanism using the electric motors, there was no way to sense backlash with several repeated adjustment required to get through the backlash before an actual correction was made. The lack of backlash compensation using the motors caused great difficulty in accurate positioning and significant frustration for the operator.

Hand wheels also have a visual centering means that allows the operator to center each mechanism before starting a new job to make sure that the full range of the mechanism was available if needed to compensate for register errors. Motors have no similar natural centering means with the result that frequently one or more mechanisms would run to a limit stop, requiring a great deal of waste in manually moving all four colors to provide for more range on the unit that ran to the stop.

When using the hand wheel in making a correction, the operator could make an exact and repeatable adjustment in either direction which is not possible when using the motor in the face of backlash.

Until now the only means of overcoming these limitations when using motors for remote positioning of registration has been to add feedback from the printed image using an automatic register control. The automatic register control would eventually correct for any error including when moving through the backlash by making a number of corrections. However automatic register controls have a number of major disadvantages including very high cost, complexity, the need for significant operator training and the difficulty of locating the printed marks that must be included in the art work for the system to operate.

This patent relates to a method to overcome all of these disadvantages and addition provides a low cost alternative to automatic register controls.

DETAILED DESCRIPTION OF THE INVENTION

Prior art motor positioning has been limited to either stepper motors in an open or closed loop configuration and other motor types in a closed loop configuration using encoder or potentiometer feedback.

1. Stepper motor control: Stepper motors are motors that advance a specific amount for each power pulse applied to the windings of the motor. They are highly susceptible to inaccurate counting in applications where high friction and inertial loads are encountered and thus in these applications an encoder is usually employed. Due to the added complexity of power circuitry and its added cost with additional maintenance and cooling requirements, stepper motors are rarely used in all but the lowest power applications with little friction and constant low inertia applications.

2. Closed loop potentiometer feedback: This method is the most common method of feedback position control currently in use on existing machines. The output of a potentiometer, (variable resistance ratio device) usually ten turns, is connected through a suitable gear ratio so that the range of the potentiometer covers the entire range of the mechanical mechanism. The position of the potentiometer slider corresponds to the position of the mechanical mechanism with the voltage ratio of the slider voltage to the excitation voltage representing an analogue of the position of the mechanical mechanism.

3. Closed loop encoder feedback. This method substitutes an encoder (usually an optical encoder) for the potentiometer as described above. Digital pulses are generated directly by the optical encoder and when accumulated in a counter represents the position of the mechanical mechanism. While this method can be more accurate than the potentiometer, it requires significant additional complexity and unacceptable costs for most position control applications in view of this disclosure.

In general all of the above methods of position control are limited and suffer from the following disadvantages:

1. For applications requiring power (1/8HP plus or minus) because of high friction or inertial loading all of the above methods of position control are cost prohibitive.

2. All of the above methods of position control require detailed engineering analysis for each application with little leeway in providing stable operation with variations in friction and inertial loading.

3. All of the above methods of position control have limited selection of available gearbox motor combinations and require engineering design for each application to incorporate limit switches which prevent damage to the mechanical mechanisms.

4. All of the above methods of position control require individual selection of all of the parts or assemblies associated with the application from numerous sources. This includes motor, gearbox, limit switches power amplifiers.

A variety of different motor types have been installed on formerly manually controlled mechanisms to provide remote activation without the need of the operator to leave his operating station to make corrections. The most common types of motors used for this purpose have been either 2 or 3 phase motors. The most common motor that has been used for this purpose for many years is the 2 phase synchronous motor and specifically the line of synchronous motors manufactured by the Superior Electric Co. under the trade name of SLO SYN. The advantage of the SLO SYN motor over other motor types is its high reliability, and its simplicity of electrical and mechanical interconnections.

The ability of the SLO SYN motor to start and stop within 0.025 seconds eliminates the need for a brake to prevent overrunning or coasting as is required in 3 phase motors when accurate positioning using this invention is desired.

Although the SLO SYN motor is ideal and provides the most accurate positioning for very large distances, it has a number of disadvantages that make it unsuitable for many applications where high inertia and friction loads are encountered and where higher resolutions and slew rates are required. Where high inertial and friction loads are encountered or where higher resolutions and slew speeds are desired, the 2 or 3 phase AC Induction Motors like those manufactured by Oriental Motor Co. of Japan are better suited using this invention.

Thus a major advantage of this invention is the ability to use many different motor types to provide for a variety of different applications.

In applications where former manually positioned mechanisms have been motorized to make it easier for the operator to make manual corrections, serious operational deficiencies have been encountered that have limited the success of this cost effective method for reducing the physical demands on operating personnel.

SUMMARY OF THE INVENTION

Among the objectives of this invention is to overcome these deficiencies and provide the following benefits:

1. Provide a means for greatly increasing the resolution or smallest magnitude of correction that can be introduced by a motorized mechanical mechanism while at the same time increasing the maximum rate of correction that can be introduced.
2. Provide the means for controlling an AC motor to make repeatable discrete positional changes in either direction on any mechanical mechanism on which a motor can be installed and without the use of an encoder or any other conventional feedback device.
3. Provide a means for controlling an AC motor to make repeatable discrete positional changes in either direction for any mechanical mechanism where a motor can be installed independent of any amount of backlash or loss motion in the mechanism or in the coupling between the motor and mechanical input to the mechanism.
4. Provide for automatic centering for each motorized mechanism that can be actuated at the beginning of each job to prevent running into mechanical stops.
5. Provide 1 through 4 to control single or multiple motors simultaneously.
6. Provide the utmost in simplicity to minimize the cost of installation and the need for operator training.

The following list details some of the advantages possible in some of the preferred embodiments of the present invention:

1. By controlling motor activation time electronically, significantly higher and significantly consistent resolutions and slew rates can be achieved.
2. The present invention provides the capability of using low cost AC induction motors with far greater tolerance of friction and inertial loads, greater flexibility and selection of motor power and gearbox ratios.
3. Accurate and repeatable position changes are made each time a switch is first pressed and then released. The time interval for correction is set in integers 120 cycles per second.
4. The low pass filter inherent in the AC induction motor due to armature inertia provides automatic gain reduction with time thus providing a much greater dynamic range with increased accuracy and speed of response over synchronous motors.
6. Repeatable positional changes can be made in both directions that are far smaller than the backlash or loss motion in the mechanism.
7. The complete elimination of any feedback device such as an encoder or potentiometer makes for a greatly simplified and less costly installation.

Briefly, the present invention is a method and means of providing a significant increase in resolution and slew rates, repeatable discrete incremental position control with automatic positioning or centering of the mechanism anywhere within its range. These advantages are provided in the face of any degree of loss motion or backlash inherent in the mechanism due to design limitations, wear or poor maintenance.

While any motor type can be used with this invention, AC synchronous and AC induction motors are the preferred motor type each providing additional unique capabilities as will be revealed.

Installation and application requirements are much simpler as no conventional encoder or feedback device is required thus greatly reducing the costs and simplifying the installation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A and 4B are an electrical schematic counter circuitry.

DETAILED DESCRIPTION OF A PREFERRED EMBODIMENT

A multiple motor controller consists of a number of components connected as stated below.

Figure 1:
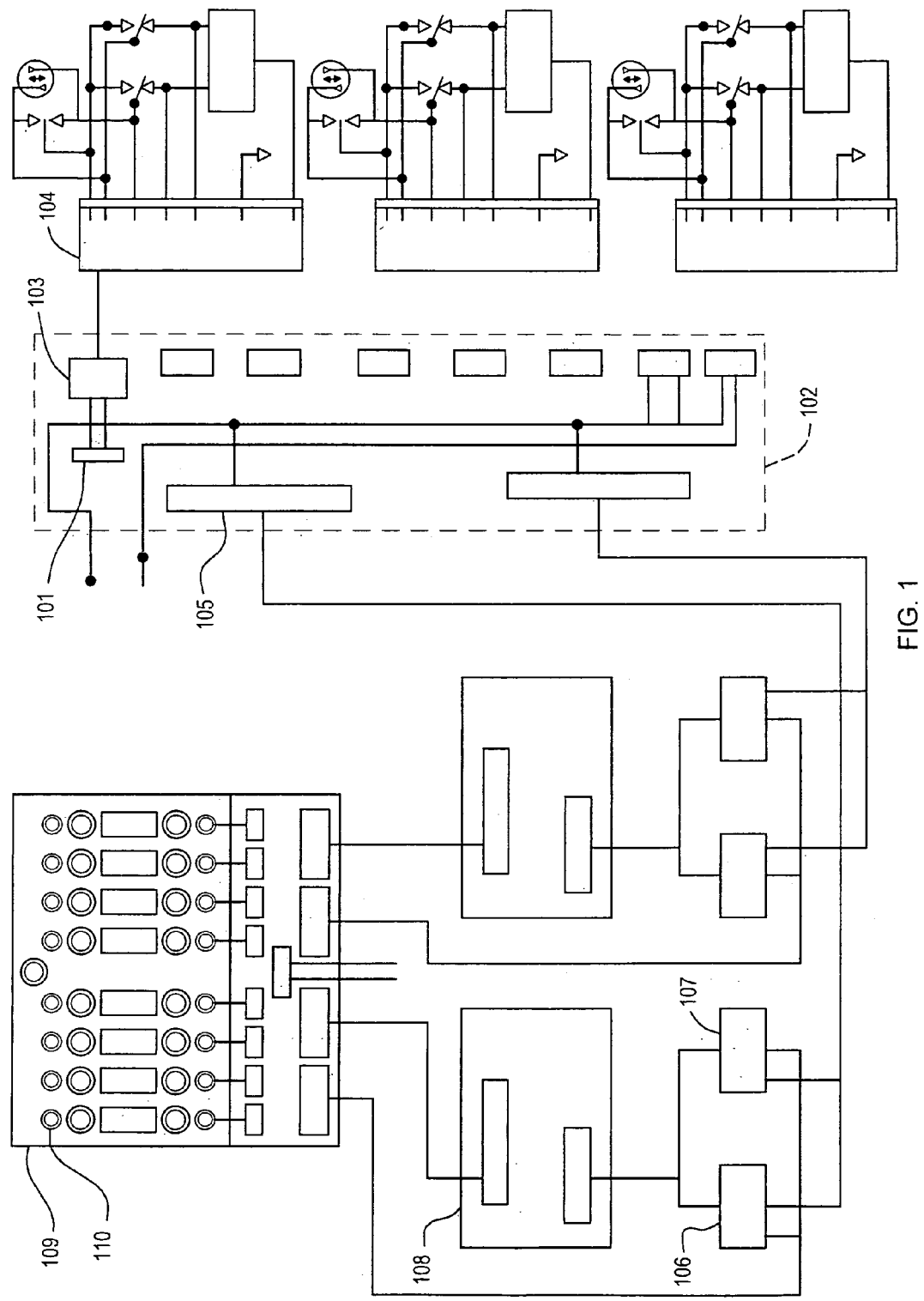
FIG. 1 is a block diagram of the system.

FIG. 1 is an overall block diagram of the interconnections of the system components that provide for simultaneous control of up to eight motors according to this disclosure. As each motor performs in the same manner the connections for one motor 104 will be described.

Figure 2:
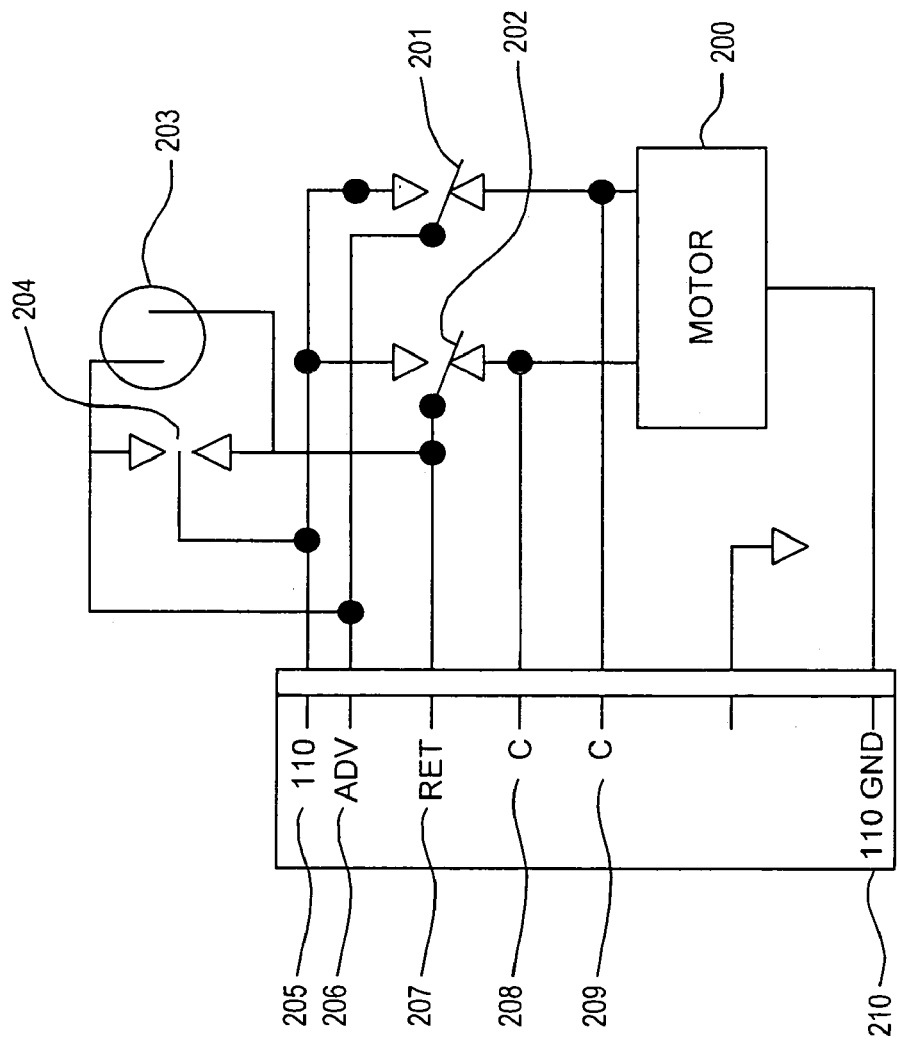
FIG. 2 is a motor schematic showing limit switches.

Motor 104 of FIG. 1 is better described from the enlarged view as shown in FIG. 2.

Motor 200 of FIG. 2 can be any motor however, the two phase reversible induction motors manufactured by the Oriental Motor Company of Japan are preferred. Motor 200 is restricted in its travel in both directions via adjustable limit switches 201 and 202. That is, when the motor runs in one direction it will eventually open either limit switch 201 or 202 to stop the motor before it jams up or causes damage to the mechanism. In addition to stopping the motor before it reaches the end of its travel, the limit switches also provide a basis for timing the motor to center it or position it to a specific position as will be discussed.

In referring back to FIG. 1, motor 104 is connected to interconnection panel 102 through connector 103. Phase shift capacitor 101 is also connected to Motor 104 through connector 103.

Motor 104 connections are routed through connector 105 and connected to solid state relay 106. Solid state relays 106 and 107 plus computer 108 provide dor bidirection control of four motors. Relays 106 and 107 are manufactured by OPTOo-22 as their Model G4PB4R.

Operator Panel 109 connects directly to computer 108 which provides the signals that are conditioned on computer 108 providing the advantages as described in this disclosure.

Figure 3:
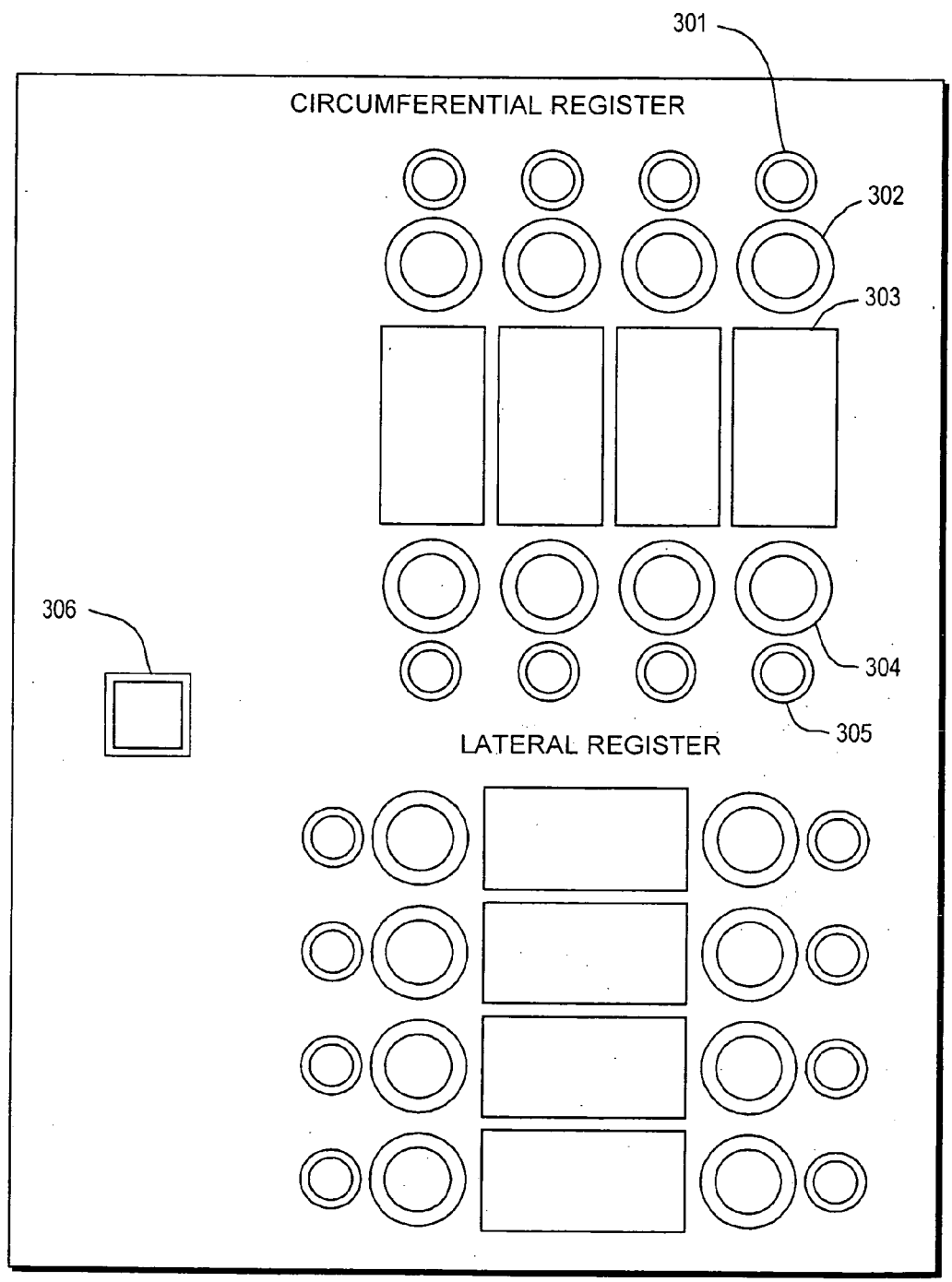
FIG. 3 illustrates an operator control panel.

FIG. 3 is a drawing of the operator control panel 109 of FIG. 1. The top four sets of operator control buttons are arranged vertically as they control the circumferential register where the lower sets of four control buttons are arranged horizontally as they control the lateral register, however the connections are the same for both functions. Thus only the right hand control buttons will be described.

303 represents a toggle switch which, when toggled in one direction, will directly activate the motor in one direction, and when toggled in the opposite direction will directly activate the motor in the opposite direction. This provides a very fast slew speed of the motor and is used only for initial setup or if large errors are present at startup.

302 and 304 are simple push buttons which when depressed will close a contact. One switch 302 closes a contact in the advance direction while the second switch 304 closes the contact in the retard direction.

301 and 305 are neon lamps that will light up when the motor is running or when it runs into a stop opening the limit switch contact 202 or 201 of FIG. 2.

Push button 306 initiates the automatic centering function as will be described.

In operation, the operator depresses an advance or retard push button 302 or 304 on Operator Control Panel 109 of FIG. 1 which sends a signal to circuit board 108 of FIG. 1 that conditions the signal, which then goes to solid state relay 106 of FIG. 1, that then activates the respective motor in the desired direction according to the instructions that come from circuit board 108.

FIGS. 4A, 4B, 5A, 5B, 6A and 6B are detailed schematics of circuitry that together with the components already described provide the features that are the subject of this invention.

Figure 4A:
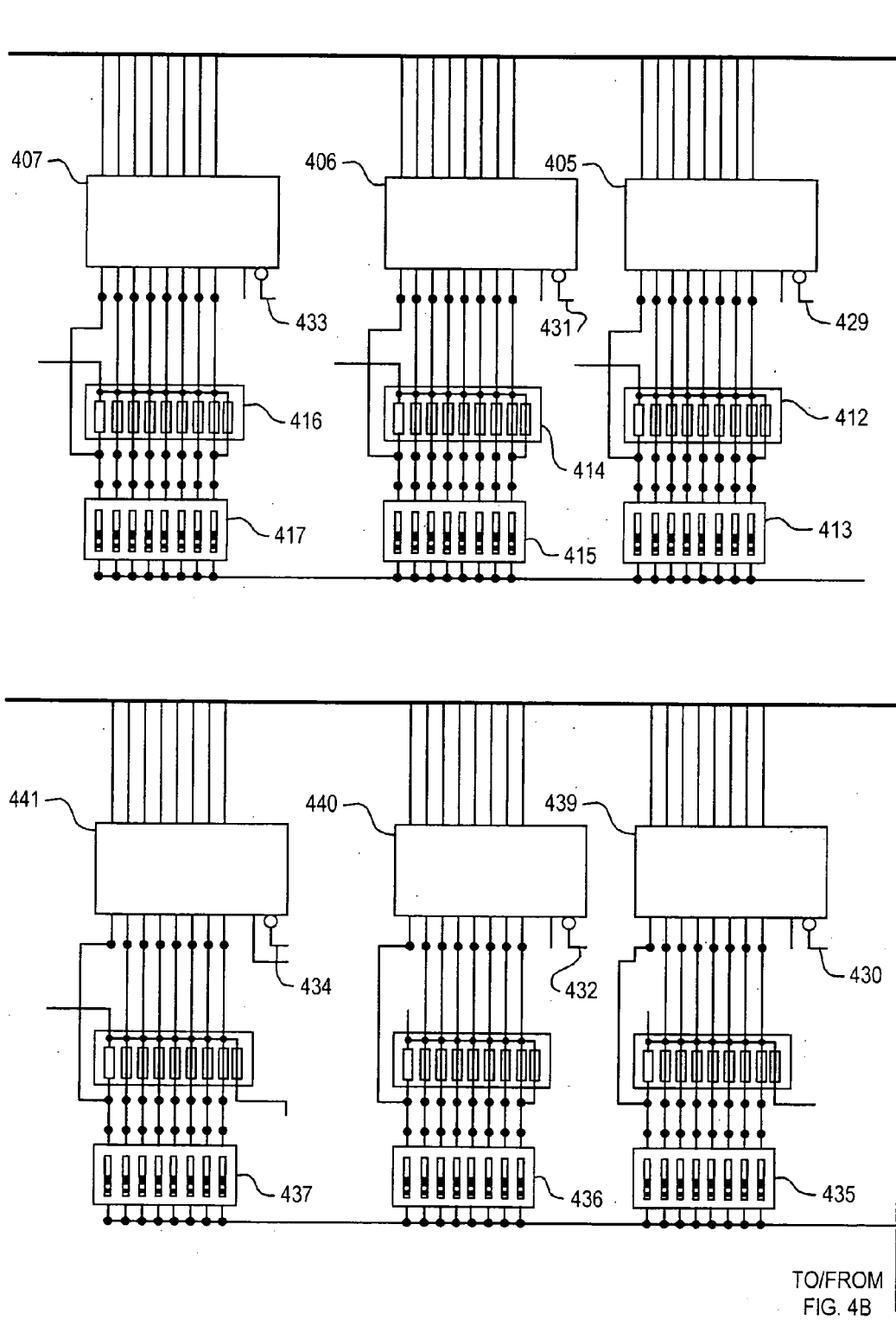
Figure 5A:
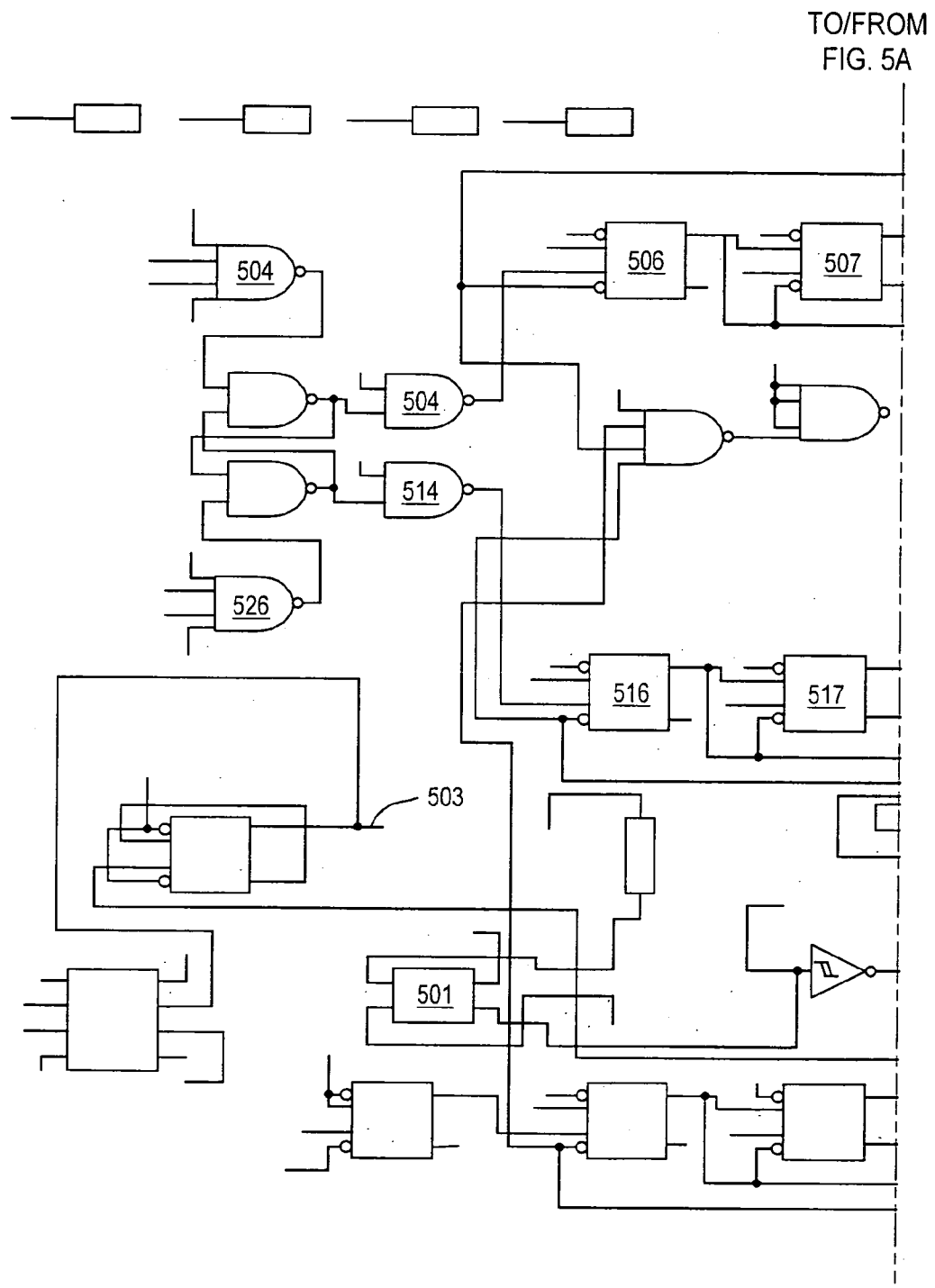
FIGS. 5A and 5B are an electrical schematic of the incremental, backlash and centering state machines.
Figure 5B:
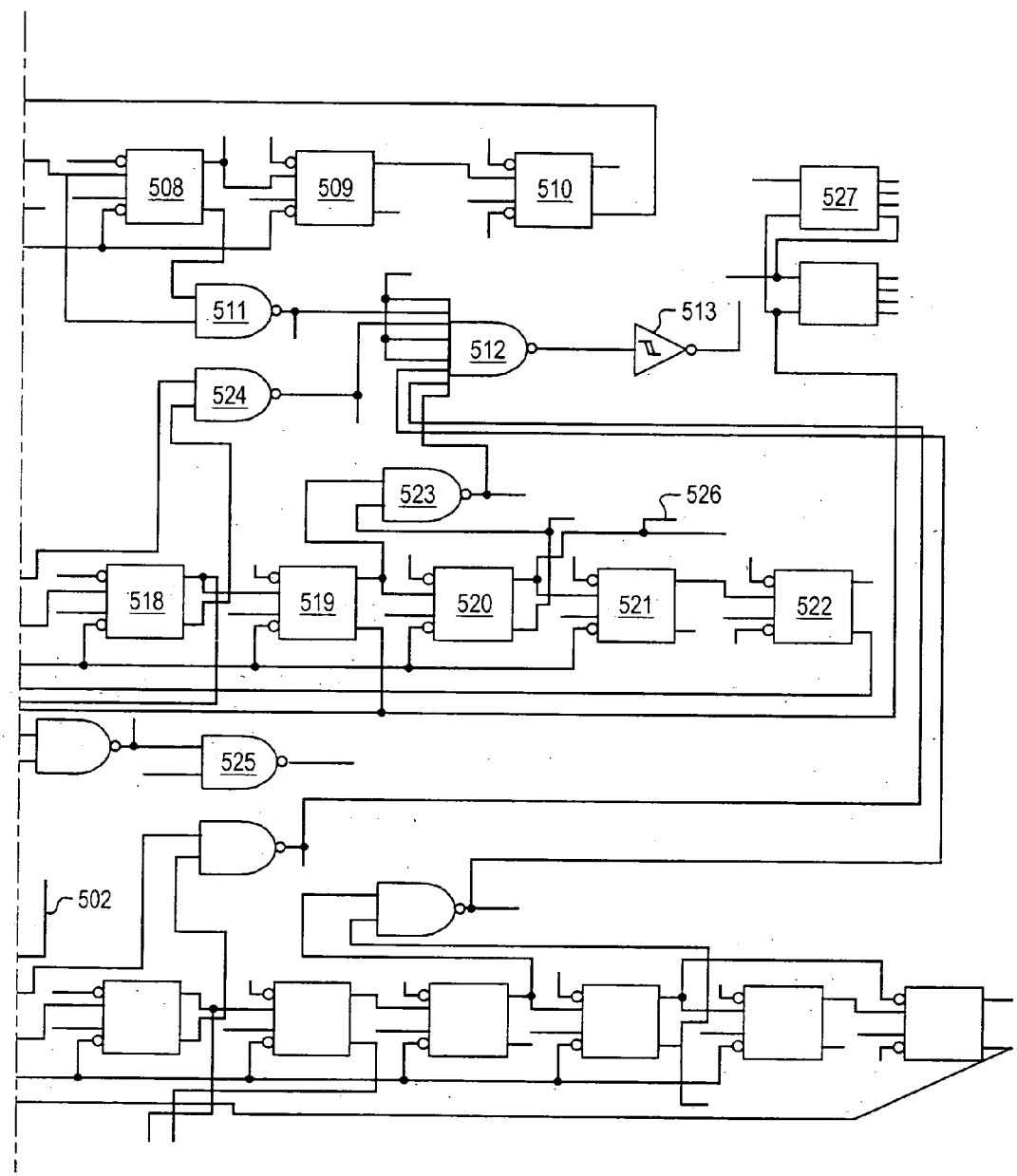

Specifically FIGS. 4A and 4B illustrate details of the counter circuitry that provides the timing to implement the features of incremental discrete correction, automatic backlash and centering. FIGS. 5A and 5B define the state machines that provide these features, and FIGS. 6A and 6B define the interface circuitry between the operator input and the resulting motor operation.

401 and 402 of FIG. 4B are 8 bit bidirectional binary counters connected as a single 16 bit counter. They are commercially available chips manufactured by Fairchild Semiconductor of Portland, Me. their product number 74F269. The 74F269 chips have an eight bit preset which is connected by a bus to chips 403 through 407(FIGS. 4A and 4B), which are Octal Bidirectional transceivers with 3 state outputs also manufactured by Fairchild Semiconductor as their product number 74F245. 8 bit binary switches 409 through 417 are connected to the inputs of transceivers 403 through 407 respectively. Eight bit pull up resisters 408 through 416 are also connected to the 8 bit binary switches 409 through 417 respectively and provide current for a binary 1 value.

Counters 401 and 402 count clock pulses 426 and 422, respectively these clock pulses can be generated from a number of sources but in this embodiment a Fairchild Semiconductor chip H11A817 which is 501 of FIG. 5 is used because of its simplicity and low cost. This chip is an optically coupled device that will generate 120 cycles per second (cps) from a 60 cps voltage source. Item 502 of FIG. 5 represents the 120 cycle clock source, and item 503 of FIG. 5 processes this frequency through a flip flop to provide a 60 cps clock source. The 120 cps clock source represent pulses that are ⅟₁₂₀ or 0.0.0083 seconds in duration.

As each set of binary switches, pull up resisters, and octal transceiver in FIGS. 4A and 4B function in the same manner only the set consisting of 409, 408, 403, 419, 420, and 421 will be described now in detail.

A binary number from 1 to 16 bits long is selected in binary switches 409 and 421. This number represents the number of 0.0083 clock time periods that the counters will be preset to, after which the counters will then count down to zero, providing a time interval equal to the present number times of 0.0083 second pulse intervals.

Incremental Advance Correction

Figure 6A:
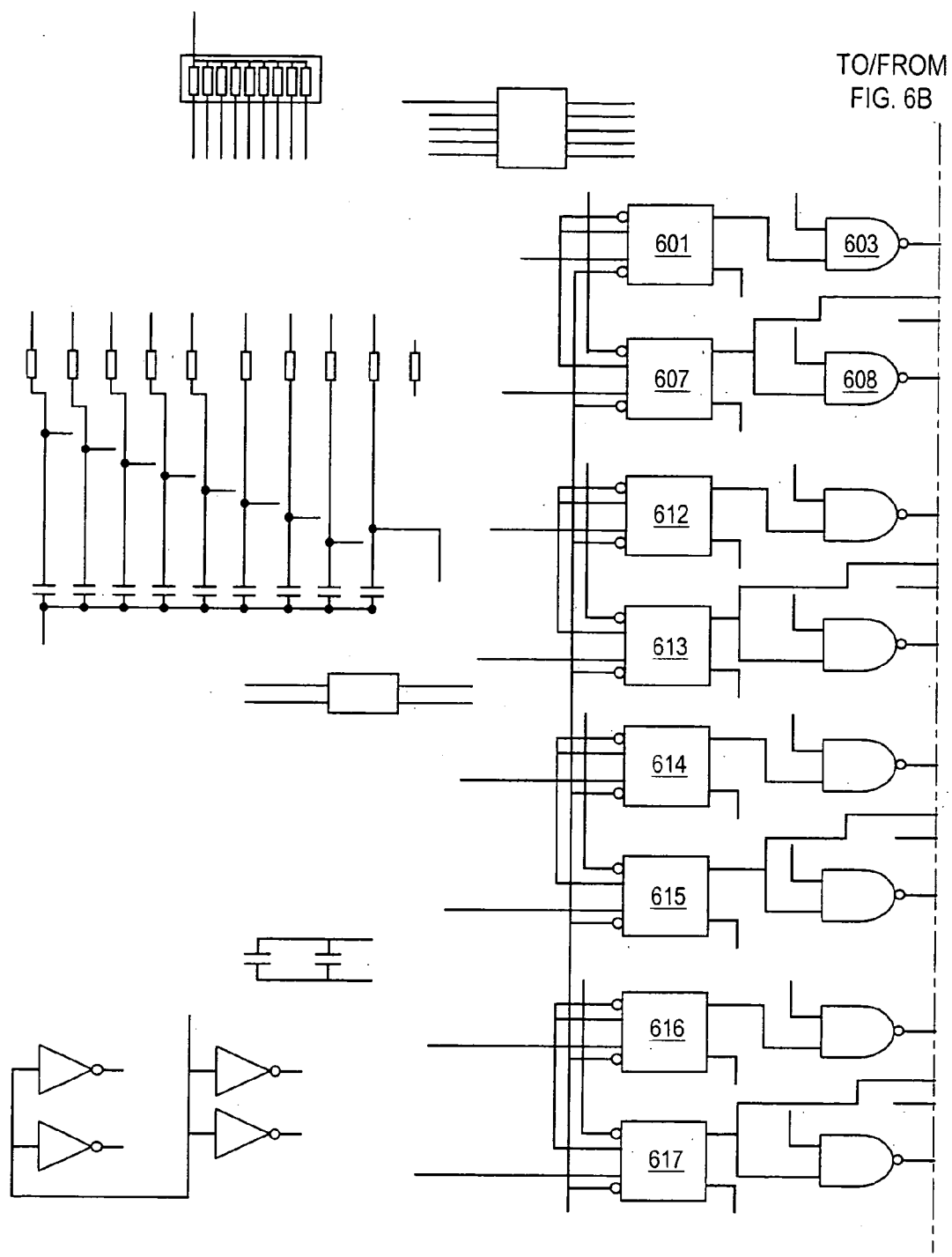
FIGS. 6A and 6B are a schematic of the operator interface logic.
Figure 6B:
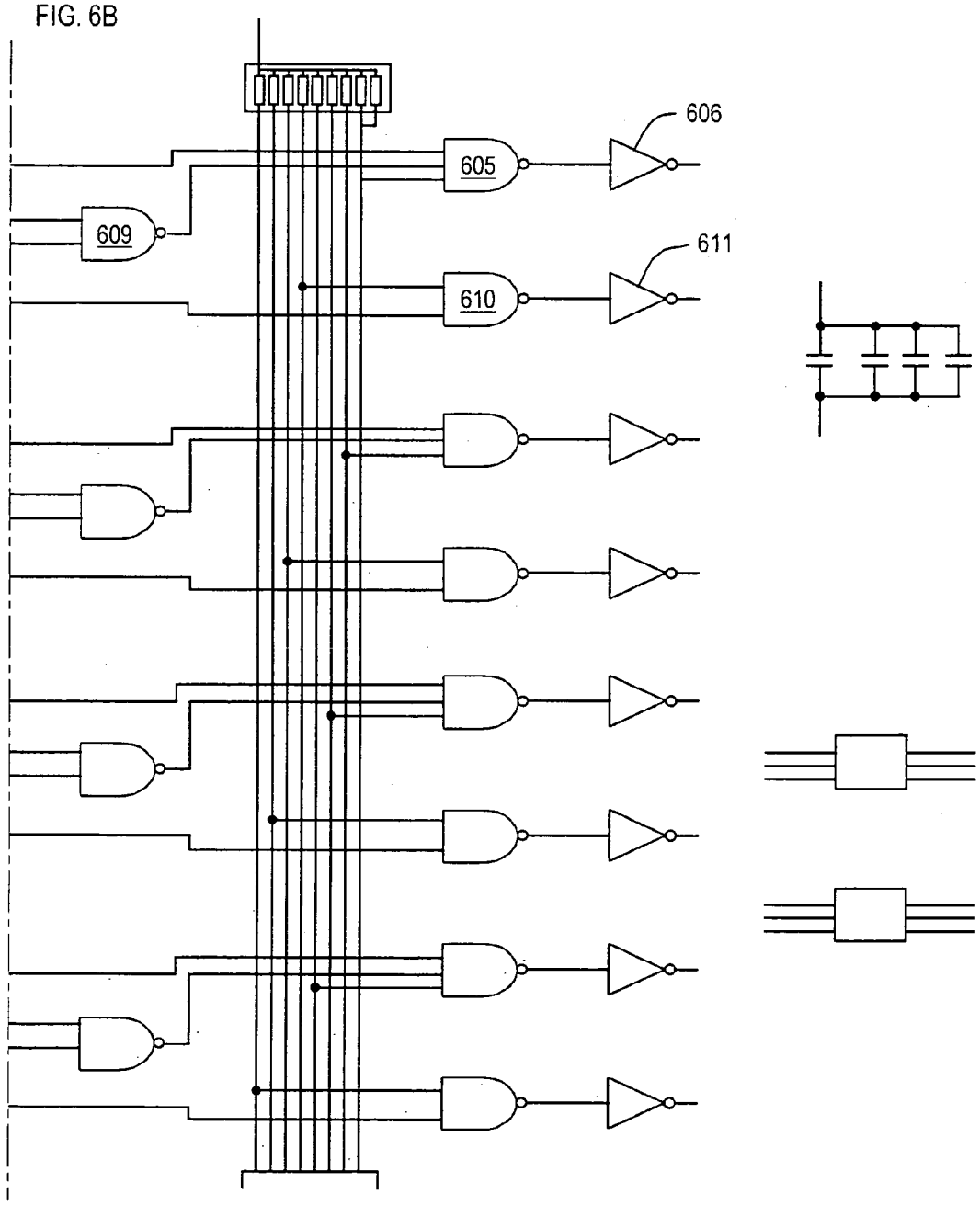

This action is triggered when the operator presses an advance push button 301 of FIG. 3, which is connected to one of the four advance flip flops (FFs) 601, 612, 614, and 616 of FIGS. 6A and 6B. For this discussion, consider that FF 601 is connected to push button 301. This initiates the following sequences:

The Q output of flip flop 601 of FIG. 6A is set to a 1.

The output of gate 504 through gate 505 clocks FF 506, setting its Q output high.

After 2 Clk pulses the Q output of FF 507 goes high and with the still high notQ of 508 provides a notA at the output of gate 511.

This notA pulse goes to 414 and 415 loading the contents of binary switches 409 and 412 in to counters 401 and 402. On the next clock cycle, the contents of binary switches 409 and 412 are clocked into the counters when the output of gate 513, PE goes low.

This starts counters 401 and 402 to count down and when they reach zero output pulse 418, notTC is asserted.

TC clocks FF 509 complete the time interval represented by the output of FF 508 TG3.

After two clock cycles, the original FF 601 of FIG. 6A that started the action is reset through the clear 602 signal of FIG. 6B.

During the time interval TG3 which is an input to 603, an output signal is generated through gates 604 and 605 which activates an optically isolated relay running the motor at full speed during the time interval TG3.

Backlash Considerations

In the advanced direction the motor is always run in the same direction so that the backlash is always loaded out in one direction. However in the retard direction the motor is first reversed for a total increment that equals an amount equal or greater than the amount of backlash defined here as (XBL) plus the amount of correction desired, called CD, and then advanced an amount equal to XBL. In this manner the mechanism is automatically loaded out in the retard direction thus providing the finest resolution independent of the magnitude of the backlash or wear in the mechanism.

Incremental Retard Correction

The action is triggered when the operator presses a retard push button 304 of FIG. 3 which is connected to one of the four retard FF's 607, 613, 615, and 617 of FIGS. 6A and 6B. For this discussion consider that FF 607 is connected to push button 304. This initiates the following sequences:

The Q output of flip flop 607 of FIG. 6A is set to 1.

The output of gate 526 through gate 514 clocks FF 516 setting Q high (FIGS. 5A and 5B).

After 2 Clk pulses the Q output of FF 517 goes high and with the still high notQ of 518 provides a notBR at the output of gate 524.

This notBA pulse goes to 427 and 428 loading the contents of binary switches 411 and 434 in to counters 401 and 402. On the next clock cycle the contents of binary switches 411 and 412 are clocked into the counters when the output of gate 513, PE goes low.

This starts counters 401 and 434 to count down and when they reach zero output pulse 418 notTC is generated.

TC clocks FF 519 completing the time interval represented by the output of gate 525 TG1. Note this is the time interval for which the motor is reversed equivalent in time to both the amount of backlash and correction desired.

During the time interval TG1 which is an input to 608, an output signal is generated through gates 610 and 611 which activates an optically isolated relay running the motor at full speed in the retard direction during the time interval TG1.

When FF 519 is clocked by TG, it starts an 8 clock delay through FF 520 and counter 527. During this delay time the motor will automatically come to a stop before a reverse voltage is applied to advance the motor. This provides a softer transition from full speed in one direction to full reverse voltage in the opposite direction.

At the end of the delay FF 520 through gate 523 loads the contents of binary switches 413 and 435 into counters 401 and 402 through pins 429 and 430 of octal bidirectional transceivers 405 and 439 respectively. At the same time the contents of binary switches 413 and 435 are loaded into the counters through gates 512 and 513.

This starts counters 401 and 402 counting down to zero and when zero is reached the signal TC clocks FF 521 producing the time interval 526 TG2.

Time interval TG2 goes to gate 609 and trough gates 605 and 606 run the motor in the advance direction for the interval TG2. 526

The remaining 9 FF's shown at the bottom of FIGS. 5A and 5B provide for automatic centering of the mechanism. However it functions in the same manner as the Retard correction and thus will not be described.

COMMENTS AND CONCLUSIONS

The previous detailed description of the method for providing exact incremental correction to a motor has a number of unique application advantages.

1. The resolution of the motor (minimum correction) can be any value depending upon the clock frequency selected and capability of the motor. In this disclosure the clock frequency is selected as 0.0083 seconds which allows the motor to be actuated for a minimum time of 0.0083 seconds.

Typically an operator can manually actuate a switch in a minimum time of about 0.33 seconds. Thus a considerable improvement in resolution is possible allowing a significant increase in slew speed for those applications where frequent large excursions in compensating mechanisms are required in setting up new jobs.

2. The ability to provide exact and repeatable corrections in either direction enable the ability to provide the same resolution in the face of any degree of backlash or wear in the mechanism.

A single 16 bit counter enables intervals of from 1 to 65,536 clock pulses. With a clock period of 0.0083 seconds, the total time intervals can be set from 0.0083 seconds to 9.102 minutes (65,536×0.0083).

In the application of motorizing previously manually controlled hand-wheels, the time intervals for both the advance and retard directions can be pre set very accurately by knowing the following information most of which is obtained by direct measurement.

A. The minimum correction desired. Example: 0.005 inch in both the advance and retard direction.

B. Maximum correction in one revolution of the handwheel. Example: 0.1 inch.

C. Maximum rate of motor correction. Example: 1"/minute.

D. Amount of loss motion when reversing direction. Example: 20 degrees.

Calculate from the above as follows

Correction/Second=0.016"/sec.

Correction time for Advance-Retard 0.005"=0.31 sec.

Correction time for loss motion 20/360×6=0.33 sec.

This one can set the binary switches as follows:

Enter into Advance Binary Switch 409 of FIG. 4 binary number 37 (0.31/0.0083) equal to LS 10100100.

Enter into Retard Binary Switch 411 of FIG. 4 binary number 77 (0.31+0.33)/0.0083 equal to LS 10110010.

Enter into Retard-Advance Binary Switch 413 of FIG. 4 binary number 39 (0.33/0.0083) equal to LS 11100100.

While this invention has been particularly shown and described with references to preferred embodiments thereof, it will be understood by those skilled in the art that various changes in form and details may be made therein without departing from the scope of the invention encompassed by the appended claims.

What is claimed is:

1. A position controller for a motor, the motor having an advance control input for moving the motor in an advance direction and a retard input for moving the motor in a retard direction, the controller additionally comprising:

an advance operator input push button for providing a control input;

a first advance digital counter, arranged to count in response to the control input, a number of cycles of a reference clock that equal a predetermined advance period of time (TG3), generating a first motor advance signal to be applied to the motor advance control input for a time period at least equal to TG3;

a retard digital counter, arranged to count after expiration of time TG3, a number of cycles of a reference clock that equal a predetermined retard period of time (TG2);

generating a motor retard signal to be applied to the motor retard control input for a time period at least equal to TG2;

a second advance digital counter, arranged to count after expiration of time TG2, a number of cycles of a reference clock that equal a predetermined advance-retard period of time (TG1);

generating a second motor advance signal to be applied to the motor advance control input for a time period at least equal to TG1.

2. An apparatus as in claim 1 wherein a delay time is imposed between the application of the first advance input and the retard input.

3. An apparatus as in claim 1 wherein the resolution of the advance and retard signal is determined by a clock signal applied to the respective digital counters.

4. An apparatus as in claim 1 wherein multiple controllers are implemented in a common subassembly to control a plurality of motors that determine the position of related subassemblies.

5. An apparatus as in claim 4 wherein the related subassemblies are printing units in a color printing press.

6. An apparatus as in claim 1 wherein the time period TG2 corresponds to a backlash amount (XBL) plus a correction amount (CD).

7. An apparatus as in claim 1 wherein the time period TG1 corresponds to a backlash amount (XPL).

* * * * *